US005250206A

United States Patent [19]

[11] Patent Number: 5,250,206

[45] Date of Patent: Oct. 5, 1993

Nakayama et al.

[54] RARE EARTH ELEMENT-FE-B OR RARE EARTH ELEMENT-FE-CO-B PERMANENT MAGNET POWDER EXCELLENT IN MAGNETIC ANISOTROPY AND CORROSION RESISTIVITY AND BONDED MAGNET MANUFACTURED THEREFROM

[75] Inventors: Ryoji Nakayama; Takuo Takeshita; Tamotsu Ogawa, all of Ohmiya, Japan

[73] Assignee: Mitsubishi Materials Corporation, Tokyo, Japan

[21] Appl. No.: 763,432

[22] Filed: Sep. 19, 1991

[30] Foreign Application Priority Data

Sep. 26, 1990 [JP] Japan .................................. 2-256704
Sep. 26, 1990 [JP] Japan .................................. 2-256705

[51] Int. Cl.[5] .............................................. C04B 35/04

[52] U.S. Cl. ................................ 252/62.54; 148/302; 420/83; 420/121

[58] Field of Search .................. 148/302; 420/83, 121; 252/62.54

[56] References Cited

U.S. PATENT DOCUMENTS

| | | | |
|---|---|---|---|
| 4,663,066 | 5/1987 | Fruchart et al. | 252/62.51 |
| 4,770,723 | 9/1988 | Sagawa et al. | 148/302 |
| 4,792,368 | 12/1988 | Sagawa et al. | 148/302 |
| 4,802,931 | 2/1989 | Croat | 148/302 |
| 4,842,656 | 6/1989 | Maines et al. | 148/302 |
| 4,891,532 | 1/1990 | Shekhawat et al. | 307/300 |
| 4,921,553 | 5/1990 | Tokunga et al. | 148/302 |
| 4,975,130 | 12/1990 | Matsuura et al. | 148/302 |
| 4,981,532 | 1/1991 | Takeshita et al. | 148/302 |
| 5,022,939 | 6/1991 | Yajima et al. | 148/302 |
| 5,049,208 | 9/1991 | Yajima et al. | 148/302 |
| 5,110,374 | 5/1992 | Takeshita et al. | 148/101 |
| 5,147,473 | 9/1992 | Ueda et al. | 148/302 |

FOREIGN PATENT DOCUMENTS

| | | |
|---|---|---|
| EP 0411571 A2 | 2/1991 | European Pat. Off. . |
| 60-63304 | 4/1985 | Japan . |
| 64-45103 | 2/1989 | Japan . |
| 64-47841 | 2/1989 | Japan . |
| 1-132106 | 5/1989 | Japan . |
| 2-164007 | 6/1990 | Japan . |

*Primary Examiner*—John P. Sheehan
*Attorney, Agent, or Firm*—Frishauf, Holtz, Goodman & Woodward

[57] ABSTRACT

A R-Fe-B or R-Fe-Co-B permanent magnet powder excellent in magnetic anisotropy and corrosion resistivity, having powder particles. The powder particles each consist essentially of, in atomic percentage:

R: 10–20%

B: 3–20%;

at least one element selected from the group consisting of Ti, V, Nb, Ta, Al, and Si: 0.001–5.0%; and Fe and inevitable impurities: the balance, The R-Fe-Co-B magnet powder further contains 0.1–50% Co.

The powder particles each have an aggregated recrystallized structure having a main phase thereof formed by a $R_2Fe_{14}B$ or $R_2(Co,Fe)_{14}B$ type intermetallic compound phase having a tetragonal structure. The intermetallic compound phase is formed of recrystallized grains aggregated therein and includes at least 50 volumetric % of recrystallized grains having a ratio b/a smaller than 2 provided that a is designated by the smallest diameter of each of the recrystallized grains, and b is by the largest diameter thereof. The recrystallized grains form the aggregated recrystallized structure having an average grain size within a range of 0.05–20 μm.

17 Claims, No Drawings

RARE EARTH ELEMENT-FE-B OR RARE EARTH ELEMENT-FE-CO-B PERMANENT MAGNET POWDER EXCELLENT IN MAGNETIC ANISOTROPY AND CORROSION RESISTIVITY AND BONDED MAGNET MANUFACTURED THEREFROM

BACKGROUND OF THE INVENTION

This invention relates to a rare earth element-Fe-B permanent magnet powder and a rare earth element-Fe-Co-B permanent magnet powder, which are excellent in magnetic anisotropy and corrosion resistivity, and bonded magnets manufactured therefrom.

Rare earth element-Fe-B alloys which are mainly composed of at least one of rare earth elements including yttrium (hereinafter referred to as "R"), Fe, and B recently drew attention as materials for permanent magnet powders excellent in magnetic properties and have widely been developed mainly for use as magnet powders for bonded magnets.

In general, bonded magnets have higher physical strength than sintered magnets though they have lower magnetic properties as compared with sintered magnets formed of the same kind of magnetic materials. Further, bonded magnets also have higher formability into various shapes than sintered magnets. For these reasons, they have been finding an increasing range of applications. A bonded magnet is usually formed of a magnet powder, and an organic binder or a metallic binder which are bonded together, and has magnetic properties dependent on magnetic properties of the magnet powder forming the magnet.

One of R-Fe-B permanent magnet powders for use in manufacturing bonded magnets mentioned above has been proposed by Japanese Provisional Patent Publication (Kokai) No. 1-132106. The proposed R-Fe-B permanent magnet powder is formed of a R-Fe-B master alloy as a raw material, the alloy having a main phase formed by a $R_2Fe_{14}B$ type intermetallic compound phase which is a ferromagnetic phase (hereinafter referred to as "$R_2Fe_{14}B$ type phase). The R-Fe-B permanent magnet powder is manufactured by subjecting the master alloy material to a heat treatment in a $H_2$ atmosphere at a temperature within a predetermined range to be transformed in phase into respective phases of $RH_x$, $Fe_2B$ and the balance of Fe, and then subjecting the phase-transformed alloy material to a dehydrogenation treatment to have $H_2$ removed therefrom to form a $R_2Fe_{14}B$ type phase which is a ferrormagnetic phase, again. The resulting R-Fe-B permanent magnet powder has an aggregated structure having a main phase formed by a very fine $R_2Fe_{14}B$ type recrystallized structure with an average grain size of 0.05–3 $\mu$m.

A R-Fe-Co-B permanent magnet powder is also described in Japanese Provisional Patent Publication (Kokai) No. 1-132106, referred to hereinbefore. Also this R-Fe-Co-B permanent magnet powder has an aggregated structure having a main phase formed by a very fine $R_2(Fe, Co)_{14}B$ type recrystallized structure with an average grain size of 0.05–3 $\mu$m, wherein part of the Fe is replaced by Co.

The conventional R-Fe-B permanent magnet powder and R-Fe-Co-B permanent magnet powder have the following disadvantages:

(i) Although they have some magnetic anisotropy, this magnetic anisotropy can be degraded depending on slight variations in the alloy composition and/or the manufacturing conditions, which makes it difficult to obtain stable and excellent magnetic anisotropy;

(ii) To impart magnetic anisotropy to a R-Fe-B or R-Fe-Co-B permanent magnet powder, it is generally known to subject such a magnet powder to hot deformation processing such as hot rolling and hot extrusion to flatten the crystalline grains. This known method can enhance the magnetic anisotropy to some degree. However, the grain-flattened permanent magnet powder inevitably has local variations in the reduction ratio. Thus, the known method is not only unable to obtain a R-Fe-B or R-Fe-Co-B permanent magnet powder which has a stable homogeneous magnetic anisotropy, but also requires complicated manufacturing steps and hence causes a high manufacturing cost.

(iii) A R-Fe-B or R-Fe-Co-B permanent magnet powder having recrystallized grains flattened by hot deformation processing is more susceptible to corrosion than a R-F-B or R-Fe-Co-B permanent magnet powder having non-flattened recrystallized grains. If such a R-Fe-B or R-Fe-Co-B permanent magnet powder with flattened recrystallized grains is stored under a hot and humid atmosphere such as in the manufacturing plant for a long time, its surface will corrode, resulting in degraded magnetic properties.

SUMMARY OF THE INVENTION

It is an object of the invention to provide a R-Fe-B permanent magnet powder and a R-Fe-Co-B permanent magnet powder which have excellent magnetic anisotropy and excellent corrosion resistivity without the need of being subjected to hot deformation processing.

It is a further object of the invention to provide bonded magnets formed of the permanent magnet powders mentioned in the preceding object.

It is another object of the invention to provide a method of manufacturing the permanent magnet powders mentioned in the preceding object.

To attain the first-mentioned object, the present invention provides, as a first aspect thereof, a R-Fe-B permanent magnet powder excellent in magnetic anisotropy and corrosion resistivity, having powder particles, wherein the powder particles each consist essentially of, in atomic percentage:

R: 10–20%;

B: 3–20%;

at least one element selected from the group consisting of Ti, V, Nb, Ta, Al, and Si: 0.001–5.0%; and Fe and inevitable impurities: the balance, the powder particles each having an aggregated recrystallized structure having a main phase thereof formed by a $R_2Fe_{14}B$ type intermetallic compound phase having a tetragonal structure, the intermetallic compound phase being formed of recrystallized grains aggregated therein and including at least 50 volumetric % of recrytallized grains having a ratio b/a smaller than 2 provided that a is designated by the smallest diameter of each of the recrystallized grains, and b is by the largest diameter thereof, the recrystallized grains forming the aggregated recrystallized structure having an average grain size within a range of 0.05–20 $\mu$m.

The invention further provides a R-Fe-B bonded magnet manufactured from the above R-Fe-B magnet powder.

According to a second aspect of the invention, there is provided a R-Fe-Co-B permanent magnet powder excellent in magnetic anisotropy and corrosion resistivity, having powder particles, wherein the powder particles each consist essentially of, in atomic percentage:

R: 10–20%;

Co: 0.1–50%;

B: 3–20%;

at least one element selected from the group consisting of Ti, V, Nb, Ta, Al, and Si: 0.001–5.0%; and Fe and inevitable impurities: the balance, the powder particles each having an aggregated recrystallized structure having a main phase thereof formed by a $R_2(Fe, Co)_{14}B$ type intermetallic compound phase having a tetragonal structure, the intermetallic compound phase being formed of recrystallized grains aggregated therein and including at least 50 volumetric % of recrytallized grains having a ratio b/a smaller than 2 provided that a is designated by the smallest diameter of each of the recrystallized grains, and b is by the largest diameter thereof, the recrystallized grains forming the aggregated recrystallized structure having an average grain size within a range of 0.05–20 μm.

The permanent magnet powder may also contain at least one element selected from the group consisting of Ni, Cu, Zn, Ga, Ge, Zr, Mo, Hf and W.

The invention further provides a R-Fe-Co-B bonded magnet manufactured from the above R-Fe-Co-B magnet powder.

The R-Fe-B magnet powder according to the invention is manufactured by a method comprising the following steps:

(i) preparing a R-Fe-B alloy consisting essentially of, in atomic percentage:

R: 10–20%;

B: 3–20%;

at least one element selected from the group consisting of Ti, V, Nb, Ta, Al, and Si: 0.001–5.0%; and Fe and inevitable impurities: the balance;

(ii) heating the prepared alloy in a hydrogen gas atmosphere;

(iii) heat treating the heated alloy at a temperature of 500°–1,000° C. in one of a hydrogen gas atmosphere and an atmosphere of a mixture of a hydrogen gas and an inert gas;

(iv) dehydrogenating the heat treated alloy such that the one atmosphere in step (iii) becomes one of a vacuum having a temperature of 500°–1,000° C. and a hydrogen pressure of 1 Torr or less and an inert gas atmosphere having a temperature of 500°–1,000° C. and a hydrogen gas partial pressure of 1 Torr or less;

(v) cooling the dehydrogenated alloy; and (vi) crushing the cooled alloy into a powder.

The R-Fe-Co-B permanent magnet powder according to the invention is manufactured by a method comprising the following steps:

(i) preparing a R-Fe-Co-B alloy consisting essentially of, in atomic percentage:

R: 10–20%;

Co: 0.1–50%;

B: 3–20%;

at least one element selected from the group consisting of Ti, V, Nb, Ta, Al, and Si: 0.001–5.0%; and Fe and inevitable impurities: the balance;

(ii) heating the prepared alloy in a hydrogen gas atmosphere;

(iii) heat treating the heated alloy at a temperature of 500°–1,000° C. in one of a hydrogen gas atmosphere and an atmosphere of a mixture of a hydrogen gas and an inert gas;

(iv) dehydrogenating the heat treated alloy such that the one atmosphere in step (iii) becomes one of a vacuum having a temperature of 500°–1,000° C. and a hydrogen pressure of 1 Torr or less and an inert gas atmosphere having a temperature of 500°–1,000° C. and a hydrogen gas partial pressure of 1 Torr or less;

(v) cooling the dehydrogenated alloy; and (vi) crushing the cooled alloy into a powder.

The above and other objects, features, and advantages of the invention will be more apparent from the ensuing detailed description.

DETAILED DESCRIPTION

Under the aforementioned the circumstances, the present inventors have made many studies in order to obtain a permanent magnet powder which is excellent in magnetic anisotropy as well as in corrosion resistivity, without requiring hot deformation processing, and as a result they have reached the following findings:

(1) A R-Fe-B permanent magnet powder or a R-Fe-Co-B permanent magnet powder having an aggregated recrystallized structure with a main phase thereof formed by a $R_2Fe_{14}B$ type phase or a $R_2(Fe, Co)_{14}B$ type phase and containing 0.001–5.0% (% is atomic %, and % will hereinafter refer to atomic % throughout the present specification unless otherwise specified) of at least one element selected from the group consisting of Ti, V, Nb, Ta, Al, and Si, exhibits excellent magnetic anisotropy even if it has not been subjected to hot deformation processing; and (2) Provided that a is designated by the smallest diameter of each of the recrystallized grains forming the above-mentioned aggregated recrystallized structure, and b is by the largest diameter thereof, a R-Fe-B permanent magnet powder or a R-Fe-Co-B permanent magnet powder, which has an aggregated recrystallized structure formed of recrystallized grains of shapes satisfying the relationship of $b/a<2$, has excellent corrosion resistivity.

The present invention is based upon the above findings, and it is characterized as follows:

a. A R-Fe-B permanent magnet powder excellent in magnetic anisotropy and corrosion resistivity, having powder particles, wherein the powder particles each consist essentially of:

R: 10–20%;

B: 3–20%;

at least one element selected from the group consisting of Ti, V, Nb, Ta, Al, and Si: 0.001–5.0%; and Fe and inevitable impurities: the balance, the powder particles each having an aggregated recrystallized structure having a main phase thereof formed by an $R_2Fe_{14}B$ type intermetallic compound phase having a tetragonal structure, the intermetallic compound phase being formed of recrystallized grains having an average grain size of 0.05–20 μm, wherein a ratio b/a is smaller than 2, provided that a is designated by the smallest diameter of each of the recrystallized grains, and b by the largest diameter thereof;

b. A bonded magnet manufactured from the R-Fe-B permanent magnet powder defined in the item a;

c. A R-Fe-Co-B permanent magnet powder excellent in magnetic anisotropy and corrosion resistivity, having powder particles, wherein the powder particles each consist essentially of:

R: 10–20%;
Co: 0.1–50%;
B: 3–20%;
at least one element selected from the group consisting of Ti, V, Nb, Ta, Al, and Si: 0.001–5.0%; and
Fe and inevitable impurities: the balance,
the powder particles each having an aggregated recrystallized structure having a main phase thereof formed by a $R_2(Fe,Co)_{14}B$ type intermetallic compound phase having a tetragonal structure, the intermetallic compound phase being formed of recrystallized grains having an average grain size of 0.05–20 μm, wherein a ratio b/a is smaller than 2, provided that a is designated by the smallest diameter of each of the recrystallized grains, and b by the largest diameter thereof;

d. A bonded magnet manufactured from the R-Fe-Co-B permanent magnet powder defined in the item c.

The R-Fe-B or R-Fe-Co-B permanent magnet powder excellent in magnetic anisotropy and corrosion resistivity according to the invention is manufactured by first preparing by means of melting and casting a R-Fe-B or R-Fe-Co-B master alloy which contains R, Fe, and B or R, Fe, Co, and B, and further contains at least one element selected from the group consisting of ti, V, Nb, Ta, Al, and Si so as to have a chemical composition within the above-mentioned range of the invention, heating the prepared master alloy in a hydrogen gas atmosphere, heat treating the heated master alloy at a temperature of 500°–1,000° C. in a hydrogen gas atmosphere or in a hydrogen gas-inert gas mixture atmosphere, dehydrogenating the heat treated alloy until the atmosphere becomes a vacuum or inert gas atmosphere having a temperature of 500°–1,000° C. and a pressure of 1 Torr or less, cooling the dehydrogenated alloy, and crushing the cooled alloy into a powder.

The manufacturing method according to the invention may further include the step of homogenizing the R-Fe-B or R-Fe-Co-B master alloy containing a predetermined amount of at least one element selected from the group consisting of Ti, V, Nb, Ta, Al, and Si, at a temperature of 600°–1,200° C., before the above heating step, and/or the step of heat treating the dehydrogenated alloy at a temperature of 300°–1,000° C., immediately following the dehydrogenating step, whereby the resulting R-Fe-B or R-Fe-Co-B permanent magnet powder has more excellent magnetic anisotropy and corrosion resistivity.

The R-Fe-B permanent magnet powder and the R-Fe-Co-B permanent magnet powder manufactured as described above each have an aggregated recrystallized structure formed of aggregated recrystallized grains of a $R_2Fe_{14}B$ type or $R_2(Fe,Co)_{14}B$ type intermetallic compound phase, which has no impurity or strain in the recrystallized grains and at the grain boundaries.

Although the average grain size of the recrystallized grains forming the aggregated recrystallized structure should be within a range of 0.05–20 μm, it is more preferable that it is within a range of 0.05–3 μm which is close to the single domain size (approx. 0.3 μm).

The recrystallized grains each having its size falling within the above range should preferably have such a shape as satisfies the relationship of $b/a<2$ where a is designated by the shortest diameter of the grain and b the largest diameter. Further, it is a requisite that recrystallized grains having shapes satisfying the above relationship should be present in an amount of 50 volumetric % or more. Since the recrystallized grains have such shapes satisfying that the ratio b/a is smaller than 2, the R-Fe-B or R-Fe-Co-B permanent magnet powder has an enhanced coercive force as well as improved corrosion resistivity. That is, it is more excellent in corrosion resistivity than the aforementioned conventional R-Fe-B or R-Fe-Co-B permanent magnet powder having magnetic anisotropy attained by hot deformation processing, and substantially free of variations in magnetic anisotropy and hence has stable and improved magnetic anisotropy, and can be manufactured with a high yield.

Further, the R-Fe-B or R-Fe-Co-B permanent magnet powder manufactured in the above described manner has a recrystallized structure is formed substantially solely of a $R_2Fe_{14}B$ or $R_2(Fe,Co)_{12}B$ intermetallic compound phase in which almost no grain boundary phase is present. Therefore, it not only has the higher magnetization for the absence of grain boundary phase, but also is able to resist corrosion occurring through the grain boundary phase. Still further, since it is free of stress strain which would otherwise be developed if the permanent magnet powder is subjected to hot deformation processing, it will be less susceptible to stress corrosion and hence has has improved corrosion resistivity.

Therefore, a bonded magnet manufactured from the R-Fe-B or R-Fe-Co-B permanent magnet powder has improved magnetic anisotropy and improved corrosion resistivity accordingly.

Next, the reasons why the chemical composition and average recrystallized grain size of the R-Fe-B or R-Fe-Co-B permanent magnet powder have been limited as mentioned above will be explained below:

(a) R:

R used in the R-Fe-B or R-Fe-Co-B permanent magnet powder of the invention is one or more elements selected from the group consisting of Nd, Pr, Tb, Dy, La, Ce, Ho, Er, Eu, Sm, Gd, Tm, Yb, Lu, and Y. In permanent magnet powders of this kind in general, Nd is mainly used together with one or more of the other rare earth elements as additives. Tb, Dy, and Pr are particularly effective to enhance the coercive force iHc of the permanent magnet powder. If the R content is less than 10% or if it is more than 20%, there will be a degradation in the coercive force, making it impossible to attain satisfactory magnetic properties. Therefore, the R content has been limited to a range of 10–20%, and preferably 11–15%.

(b) B:

If the B content is less than 3% or if it is more than 20%, the coercive force of the permanent magnet powder will degrade, also making it impossible to obtain satisfactory magnetic properties. Therefore, the B content has been limited to a range of 3–20%. and preferably 4–8%.

Part of the B may be replaced by C, N, O and/or F, with equivalent results.

(c) Co:

Co, if added to the permanent magnet powder of the invention, acts to enhance the coercive force and temperature-dependent magnetic properties (e.g. Curie point) and also enhance the corrosion resistivity. However, if the Co content is less than 0.1%, the above action cannot be performed to a desired extent, whereas in excess of 50%, there will occur a degradation in the magnetic properties. Thus, the Co content has been limited to a range of 0.1–50%. In addition, Co, if contained in a range of 0.1–20%, exhibits the best coercive force, and therefore the preferable range is 0.1–20%.

(d) Ti, V, Nb, Ta, Al, and Si:

These ingredients, if contained in the R-Fe-B or R-Fe-Co-B permanent magnet powder of the invention, act to enhance the coercive force and increase stable magnetic anisotropy and corrosion resisivity. If their total content is less than 0.001%, such results cannot be attained to a desired extent, whereas if it is above 5.0%, there will be a degradation in the magnetic properties. Therefore, the content of Ti, V, Nb, Ta, Al, and Si has been limited to a range of 0.001-5.0%. A preferable range is 0.01-3.0%.

The R-Fe-B or R-Fe-Co-B permanent magnet powder may further include 0.001-5.0% of at least one element selected from the group consisting of Ni, Cu, Zn, Ga, Ge, Zr, Mo, Hf, and W, which also imparts excellent magnetic anisotropy and corrosion resistivity to the magnet powder.

(e) Average Recrystallized Grain Size:

If the $R_2Fe_{14}B$ Or $R_2(Fe,Co)_{14}B$ type recrystallized grains forming respective powder of the R-Fe-B or R-Fe-Co-B permanent magnet powder have an average grain size of less than 0.05 μm, the powder cannot be magnetized with ease, whereas if the average grain size is above 20 μm, the coercive force will degrade, and also the degree of squareness of the magnetic hysteresis curve will decrease, resulting in a degradation in the magnetic properties.

Therefore, the average recrystallized grain size has been limited to a range of 0.05-20 μm. It is more preferable to limit the average grain size range to 0.05-3 μm which is closer to the single domain size (approx. 0.3 μm).

Although the reasons for various limitations about the R-Fe-B or R-Fe-Co-B permanent magnet powder have been described above, same reasons as above can also apply to a R-Fe-B or R-Fe-Co-B bonded magnet manufactured from the R-Fe-B or R-Fe-Co-B permanent magnet powder.

EXAMPLES

The invention will be further described in detail with reference to examples of the invention and comparative examples:

I. Examples 1-46, Comparative Examples 1-14, and Examples of Prior Art 1-2:

R-Fe-B alloy ingots containing one or more of Ti, V, Nb, Ta, Al, and Si, and R-Fe-B alloy ingots not containing any of Ti, V, Nb, Ta, Al, and Si, having chemical compositions shown in Table 1 were prepared by plasma melting followed by casting. These ingots were subjected to a homogenization treatment by soaking at a temperature of 1140° C. in an argon gas atmosphere for 20 hours, and the homogenized ingots were crushed into sizes of about 20 mm square as starting alloy materials. The starting alloy materials were heated from room temperature up to 840° C. in a hydrogen gas atmosphere under 1 atmospheric pressure and then heat treated by soaking at 840° C. for 4 hours in the hydrogen gas atmosphere. Then, the hydrogen gas atmosphere was dehydrogenated until its temperature became 830° C. and its vacuum became $1\times10^{-1}$Torr or less, immediately followed by charging an argon gas into the furnace to rapidly cool the charged material alloys. After the dehydrogenation, the charged material alloys were again heat treated at 650° C. in the argon gas atmosphere. The heat treated alloys were charged into a mortar and lightly crushed into magnet powders having an average particle size of 40 μm according to Examples 1-46, Comparative Examples 1-14 and Prior Art Example 1. Part of the starting material alloy of Prior Art Example 1 obtained just after the dehydrogenation was hot pressed at 680° C. under a vacuum of $1\times10^{-3}$Torr into a relative density of 98%, followed by being subjected to deformation processing at 750° C. until its height was reduced to one fourth as high as its original height. The resulting bulk was crushed into an average particle size of 40 μm to obtain a magnet powder according to Prior Art Example 2. The R-Fe-B permanent magnet powders according to Examples 1-46, Comparative Examples 1-14 and Prior Art Examples 1-2 thus prepared were subjected to measurements of the average recrystallized grain size and amount (volumetric %) of recrystallized grains which satisfy the aforementioned relationship of $b/a<2$. Then, these R-Fe-B permanent magnet powders were sieved into particle sizes falling within a range of 50-420 μm, and the thus sieved powders were each picked up in part by an amount of 100 g, and the picked up powders were subjected to a humidity test where they were soaked in an atmosphere having a temperature of 80° C. and a humidity of 95%. After the soaking over 1,000 hours, a change in the weight of each powder due to oxidation was measured, the results of which are shown in terms of weight change percent (weight %) in Table 1.

The R-Fe-B permanent magnet powders according to Examples 1-46, Comparative Examples 1-14, and Prior Art Examples 1-2 were mixed with 3 weight % of epoxy resin, and the resulting mixture was press molded under a pressure of 6 Ton/cm² in a transverse magnetic field of 25KOe or in a non-magnetic field, followed by being subjected to a thermosetting treatment where they were soaked at 120° C. for 2 hours, to obtain bonded magnets according to Examples 1-46, Comparative Examples 1-14, and Prior Art Examples 1-2.

The bonded magnets obtained by press molding in the transverse magnetic field and those obtained by press molding in the non-magnetic field were measured in respect of magnetic properties, the results of which are shown in Table 1. The measured magnetic properties of the two groups of bonded magnets were compared with each other to evaluate the magnetic anisotropy.

TABLE 1

| SPECIMEN | | R—Fe—B PERMANENT MAGNETIC POWDER: CHEMICAL COMPOSITION (ATOMIC %) Nd | Dy | Pr | Tb | B | Ti | V | Nb | Ta | Al | Si | TOTAL | Fe | AVERAGE GRAIN SIZE (μm) | AMOUNT OF GRAINS HAVING RATIO b/a 2 (VOL. %) | WEIGHT CHANGE PERCENT (WT %) | PRESENCE OF MAGNETIC FIELD | PROPERTIES OF BONDED MAGNETS Br (KG) | iHc (KOe) | $BH_{max}$ (MGOe) |
|---|---|---|---|---|---|---|---|---|---|---|---|---|---|---|---|---|---|---|---|---|---|
| EXAMPLES ACCORDING TO PRESENT INVENTION | 1 | 12.1 | — | 0.5 | — | 6.0 | 0.01 | — | — | — | — | — | 0.01 | BAL. | 0.3 | 95 | 0.323 | PRESENT | 7.6 | 8.8 | 12.0 |
| | | | | | | | | | | | | | | | | | | NIL | 6.0 | 8.9 | 7.7 |
| | 2 | 12.0 | — | 0.5 | — | 6.1 | 0.1 | — | — | — | — | — | 0.1 | BAL. | 0.2 | 90 | 0.315 | PRESENT | 7.9 | 8.3 | 13.8 |
| | | | | | | | | | | | | | | | | | | NIL | 5.9 | 8.5 | 7.5 |
| | 3 | 12.0 | — | 0.5 | — | 6.0 | 0.5 | — | — | — | — | — | 0.5 | BAL. | 0.3 | 90 | 0.302 | PRESENT | 7.7 | 7.1 | 12.0 |
| | | | | | | | | | | | | | | | | | | NIL | 5.9 | 7.4 | 7.3 |
| | 4 | 12.0 | 0.5 | 0.5 | — | 5.9 | 5.0 | — | — | — | — | — | 5.0 | BAL. | 0.2 | 90 | 0.267 | PRESENT | 7.6 | 5.0 | 10.8 |
| | | | | | | | | | | | | | | | | | | NIL | 5.2 | 5.3 | 4.8 |
| | 5 | 12.1 | — | 0.2 | 0.2 | 6.0 | — | 0.01 | — | — | — | — | 0.01 | BAL. | 0.4 | 90 | 0.290 | PRESENT | 7.5 | 9.0 | 11.6 |
| | | | | | | | | | | | | | | | | | | NIL | 5.9 | 9.9 | 7.6 |
| | 6 | 12.0 | — | 0.2 | 0.2 | 5.9 | — | 0.1 | — | — | — | — | 0.1 | BAL. | 0.1 | 85 | 0.291 | PRESENT | 8.0 | 9.5 | 14.1 |
| | | | | | | | | | | | | | | | | | | NIL | 5.8 | 9.8 | 7.4 |
| | 7 | 12.1 | — | 0.2 | 0.2 | 6.0 | — | 1.0 | — | — | — | — | 1.0 | BAL. | 0.3 | 85 | 0.276 | PRESENT | 7.8 | 9.1 | 12.0 |
| | | | | | | | | | | | | | | | | | | NIL | 5.6 | 9.3 | 6.9 |
| | 8 | 12.0 | — | 0.2 | 0.2 | 6.1 | — | 5.0 | — | — | — | — | 5.0 | BAL. | 0.2 | 95 | 0.188 | PRESENT | 7.5 | 7.9 | 11.4 |
| | | | | | | | | | | | | | | | | | | NIL | 5.7 | 8.2 | 5.5 |
| | 9 | 12.0 | 0.2 | 0.2 | — | 6.1 | — | — | 0.01 | — | — | — | 0.01 | BAL. | 0.5 | 90 | 0.304 | PRESENT | 7.7 | 9.2 | 13.3 |
| | | | | | | | | | | | | | | | | | | NIL | 6.0 | 9.3 | 7.8 |
| | 10 | 12.1 | 0.1 | 0.3 | — | 6.1 | — | — | 0.2 | — | — | — | 0.2 | BAL. | 0.1 | 100 | 0.282 | PRESENT | 8.2 | 8.2 | 15.2 |
| | | | | | | | | | | | | | | | | | | NIL | 5.9 | 8.6 | 7.6 |
| | 11 | 12.2 | 0.2 | 0.2 | — | 6.0 | — | — | 1.0 | — | — | — | 1.0 | BAL. | 0.4 | 90 | 0.254 | PRESENT | 7.9 | 7.6 | 13.9 |
| | | | | | | | | | | | | | | | | | | NIL | 5.7 | 8.0 | 7.0 |
| | 12 | 12.2 | 0.2 | 0.2 | — | 6.0 | — | — | 5.0 | — | — | — | 5.0 | BAL. | 0.3 | 95 | 0.166 | PRESENT | 7.7 | 5.7 | 10.2 |
| | | | | | | | | | | | | | | | | | | NIL | 5.2 | 6.0 | 5.4 |
| | 13 | 12.0 | 0.3 | 0.2 | — | 6.1 | — | — | — | 0.03 | — | — | 0.03 | BAL. | 0.2 | 100 | 0.286 | PRESENT | 7.8 | 9.3 | 13.8 |
| | | | | | | | | | | | | | | | | | | NIL | 5.9 | 9.5 | 7.6 |
| | 14 | 11.9 | 0.3 | 0.2 | — | 6.1 | — | — | — | 0.1 | — | — | 0.1 | BAL. | 0.2 | 85 | 0.257 | PRESENT | 8.0 | 8.9 | 14.5 |
| | | | | | | | | | | | | | | | | | | NIL | 5.8 | 9.2 | 7.7 |
| | 15 | 12.6 | 0.3 | 0.2 | — | 6.0 | — | — | — | 3.0 | — | — | 3.0 | BAL. | 0.3 | 90 | 0.241 | PRESENT | 7.6 | 7.3 | 12.5 |
| | | | | | | | | | | | | | | | | | | NIL | 5.5 | 7.6 | 6.4 |
| | 16 | 12.0 | 0.3 | 0.2 | — | 6.1 | — | — | — | 5.0 | — | — | 5.0 | BAL. | 0.4 | 90 | 0.192 | PRESENT | 7.5 | 5.6 | 10.5 |
| | | | | | | | | | | | | | | | | | | NIL | 5.1 | 5.8 | 4.8 |
| | 17 | 12.2 | — | 0.2 | — | 6.0 | — | — | — | — | 0.01 | — | 0.01 | BAL. | 0.3 | 70 | 0.323 | PRESENT | 6.7 | 9.3 | 10.1 |
| | | | | | | | | | | | | | | | | | | NIL | 5.8 | 9.4 | 7.0 |
| | 18 | 12.1 | — | 0.2 | — | 6.1 | — | — | — | — | 0.5 | — | 0.5 | BAL. | 1.0 | 85 | 0.303 | PRESENT | 7.6 | 10.3 | 13.2 |
| | | | | | | | | | | | | | | | | | | NIL | 5.9 | 10.5 | 7.8 |
| | 19 | 12.3 | — | 0.2 | — | 6.1 | — | — | — | — | 2.0 | — | 2.0 | BAL. | 1.0 | 80 | 0.282 | PRESENT | 7.1 | 12.1 | 11.6 |
| | | | | | | | | | | | | | | | | | | NIL | 5.7 | 12.3 | 7.5 |
| | 20 | 12.2 | — | 0.2 | — | 6.1 | — | — | — | — | 4.6 | — | 4.6 | BAL. | 2.0 | 70 | 0.150 | PRESENT | 7.2 | 9.6 | 11.0 |
| | | | | | | | | | | | | | | | | | | NIL | 5.2 | 9.8 | 5.7 |
| | 21 | 12.4 | — | — | — | 6.0 | — | — | — | — | — | 0.05 | 0.05 | BAL. | 0.2 | 90 | 0.284 | PRESENT | 7.1 | 10.8 | 11.5 |
| | | | | | | | | | | | | | | | | | | NIL | 5.8 | 11.0 | 7.4 |
| | 22 | 12.5 | — | — | — | 6.1 | — | — | — | — | — | 0.5 | 0.5 | BAL. | 0.3 | 80 | 0.259 | PRESENT | 7.8 | 12.6 | 13.7 |
| | | | | | | | | | | | | | | | | | | NIL | 6.0 | 12.8 | 8.0 |
| | 23 | 12.5 | — | — | — | 6.0 | — | — | — | — | — | 1.5 | 1.5 | BAL. | 0.5 | 90 | 0.236 | PRESENT | 8.1 | 11.5 | 14.6 |
| | | | | | | | | | | | | | | | | | | NIL | 5.8 | 11.8 | 7.5 |
| | 24 | 12.5 | — | — | — | 6.0 | — | — | — | — | — | 4.9 | 4.9 | BAL. | 0.8 | 90 | 0.177 | PRESENT | 6.6 | 9.4 | 10.1 |

TABLE 1-continued

| SPECIMEN | | R—Fe—B PERMANENT MAGNETIC POWDER: CHEMICAL COMPOSITION (ATOMIC %) Nd | Dy | Pr | Tb | B | Ti | V | Nb | Ta | Al | Si | TOTAL | Fe | AVERAGE GRAIN SIZE (μm) | AMOUNT OF GRAINS HAVING RATIO b/a 2 (VOL. %) | WEIGHT CHANGE PERCENT (WT %) | PRESENCE OF MAGNETIC FIELD | PROPERTIES OF BONDED MAGNETS Br (KG) | iHc (KOe) | $BH_{max}$ (MGOe) |
|---|---|---|---|---|---|---|---|---|---|---|---|---|---|---|---|---|---|---|---|---|---|
| | | | | | | | | | | | | | | | | | | NIL | 5.1 | 9.6 | 5.5 |
| | 25 | 12.4 | — | — | — | 7.0 | — | — | 0.2 | — | — | 1.0 | 1.2 | BAL. | 0.06 | 95 | 0.216 | PRESENT | 8.3 | 11.8 | 15.1 |
| | | | | | | | | | | | | | | | | | | NIL | 5.6 | 12.2 | 6.8 |
| | 26 | 12.3 | — | — | — | 6.0 | — | — | — | 0.1 | 0.1 | 1.0 | 1.2 | BAL. | 0.4 | 95 | 0.223 | PRESENT | 8.3 | 11.0 | 15.0 |
| | | | | | | | | | | | | | | | | | | NIL | 5.5 | 11.4 | 6.5 |
| | 27 | 12.4 | — | — | — | 6.0 | — | 0.1 | 0.2 | — | 0.5 | — | 0.8 | BAL. | 0.3 | 90 | 0.295 | PRESENT | 8.4 | 10.5 | 15.8 |
| | | | | | | | | | | | | | | | | | | NIL | 5.6 | 10.9 | 6.6 |
| | 28 | 12.3 | — | — | — | 6.0 | 0.5 | — | 2.5 | — | — | 1.0 | 4.0 | BAL. | 0.2 | 90 | 0.184 | PRESENT | 8.0 | 10.3 | 14.4 |
| | | | | | | | | | | | | | | | | | | NIL | 5.6 | 10.6 | 6.7 |
| | 29 | 12.2 | — | 0.4 | — | 6.0 | — | 0.3 | 0.3 | — | — | — | 0.6 | BAL. | 0.4 | 90 | 0.220 | PRESENT | 8.2 | 8.4 | 14.3 |
| | | | | | | | | | | | | | | | | | | NIL | 5.6 | 8.7 | 6.4 |
| | 30 | 12.2 | — | 0.4 | — | 6.0 | — | — | — | 0.2 | — | 0.5 | 0.7 | BAL. | 0.3 | 100 | 0.264 | PRESENT | 8.2 | 10.1 | 14.7 |
| | | | | | | | | | | | | | | | | | | NIL | 5.7 | 10.3 | 7.1 |
| | 31 | 12.2 | — | 0.4 | — | 6.0 | — | — | 0.2 | 0.2 | 0.2 | 0.2 | 0.8 | BAL. | 0.5 | 70 | 0.247 | PRESENT | 8.0 | 10.1 | 14.0 |
| | | | | | | | | | | | | | | | | | | NIL | 5.6 | 10.5 | 6.5 |
| | 32 | 12.2 | — | 0.4 | — | 6.1 | — | — | — | 0.5 | 0.5 | 0.5 | 1.5 | BAL. | 2.0 | 90 | 0.215 | PRESENT | 7.9 | 12.1 | 14.0 |
| | | | | | | | | | | | | | | | | | | NIL | 5.7 | 12.3 | 7.1 |
| | 33 | 12.2 | — | 0.4 | — | 6.0 | 0.1 | 0.1 | — | — | 0.5 | 0.5 | 1.2 | BAL. | 0.5 | 85 | 0.241 | PRESENT | 7.9 | 11.4 | 13.8 |
| | | | | | | | | | | | | | | | | | | NIL | 5.7 | 11.8 | 7.0 |
| | 34 | 12.2 | — | 0.4 | — | 6.0 | 0.1 | 0.1 | 0.3 | 0.3 | 0.3 | 0.5 | 1.6 | BAL. | 0.3 | 90 | 0.237 | PRESENT | 8.1 | 10.4 | 14.5 |
| | | | | | | | | | | | | | | | | | | NIL | 5.5 | 10.7 | 6.4 |
| | 35 | 12.2 | — | 0.4 | — | 6.0 | 0.1 | 0.1 | 0.1 | 0.1 | 0.1 | 0.1 | 0.6 | BAL. | 0.2 | 90 | 0.286 | PRESENT | 8.2 | 9.4 | 15.0 |
| | | | | | | | | | | | | | | | | | | NIL | 5.6 | 9.6 | 6.4 |
| | 36 | 13.0 | 0.8 | — | — | 5.9 | — | — | — | — | — | 1.0 | 1.5 | BAL. | 1.0 | 60 | 0.312 | PRESENT | 7.6 | 14.1 | 13.3 |
| | | | | | | | | | | | | | | | | | | NIL | 5.6 | 14.5 | 7.1 |
| | 37 | 13.0 | 0.9 | — | — | 5.9 | — | — | — | — | 0.5 | 1.0 | 1.5 | BAL. | 2.0 | 50 | 0.368 | PRESENT | 7.5 | 13.0 | 13.0 |
| | | | | | | | | | | | | | | | | | | NIL | 5.6 | 13.2 | 7.0 |
| | 38 | 10.0 | — | — | — | 7.0 | — | 0.1 | — | 0.1 | — | 1.5 | 1.7 | BAL. | 0.1 | 90 | 0.202 | PRESENT | 9.4 | 8.1 | 12.8 |
| | | | | | | | | | | | | | | | | | | NIL | 5.6 | 8.4 | 3.7 |
| | 39 | 14.0 | — | — | — | 7.2 | — | 0.1 | — | 0.1 | — | 1.5 | 1.7 | BAL. | 0.4 | 85 | 0.383 | PRESENT | 7.2 | 12.3 | 12.0 |
| | | | | | | | | | | | | | | | | | | NIL | 5.7 | 12.6 | 7.3 |
| | 40 | 20.0 | — | — | — | 7.0 | — | 0.1 | — | 0.1 | — | 1.5 | 1.7 | BAL. | 2.0 | 70 | 0.624 | PRESENT | 6.9 | 9.5 | 10.4 |
| | | | | | | | | | | | | | | | | | | NIL | 4.5 | 9.7 | 4.0 |
| | 41 | 15.8 | 0.5 | — | — | 3.0 | 0.1 | 0.1 | 0.1 | — | 0.2 | 1.0 | 1.5 | BAL. | 0.5 | 80 | 0.581 | PRESENT | 7.8 | 7.6 | 10.1 |
| | | | | | | | | | | | | | | | | | | NIL | 4.5 | 8.0 | 3.4 |
| | 42 | 13.0 | — | 0.5 | — | 10.0 | 0.1 | 0.1 | 0.1 | — | 0.5 | 1.0 | 1.8 | BAL. | 1.0 | 85 | 0.370 | PRESENT | 7.4 | 11.4 | 12.0 |
| | | | | | | | | | | | | | | | | | | NIL | 5.3 | 11.8 | 6.2 |
| | 43 | 14.0 | 1.0 | — | — | 20.0 | 0.1 | 0.2 | 0.1 | — | 0.5 | 1.0 | 1.9 | BAL. | 3.0 | 80 | 0.522 | PRESENT | 8.5 | 9.4 | 10.4 |
| | | | | | | | | | | | | | | | | | | NIL | 4.8 | 9.6 | 4.2 |
| | 44 | 13.0 | — | — | 0.5 | 7.2 | — | — | 0.2 | — | 1.0 | — | 1.2 | BAL. | 5.0 | 70 | 0.676 | PRESENT | 7.8 | 10.7 | 11.0 |
| | | | | | | | | | | | | | | | | | | NIL | 4.7 | 11.0 | 3.7 |
| | 45 | 13.0 | — | — | 0.5 | 7.2 | — | — | 0.2 | — | 1.0 | — | 1.2 | BAL. | 10.0 | 85 | 0.701 | PRESENT | 8.4 | 5.7 | 10.5 |
| | | | | | | | | | | | | | | | | | | NIL | 5.6 | 5.9 | 4.4 |
| | 46 | 13.0 | — | — | 0.5 | 7.2 | — | — | 0.2 | — | 1.0 | — | 1.2 | BAL. | 20.0 | 80 | 0.988 | PRESENT | 8.7 | 5.3 | 10.2 |
| | | | | | | | | | | | | | | | | | | NIL | 5.2 | 5.5 | 4.1 |
| COMPARATIVE EXAMPLES | 1 | 12.1 | 0.4 | — | — | 6.0 | 7.0* | — | — | — | — | — | 7.0* | BAL. | 0.3 | 80 | 0.242 | PRESENT | 6.2 | 2.1 | 3.0 |
| | | | | | | | | | | | | | | | | | | NIL | 4.5 | 2.4 | 2.1 |

TABLE 1-continued

| SPECIMEN | R—Fe—B PERMANENT MAGNETIC POWDER: CHEMICAL COMPOSITION (ATOMIC %) Nd | Dy | Pr | Tb | B | Ti | V | Nb | Ta | Al | Si | TOTAL | Fe | AVERAGE GRAIN SIZE (μm) | AMOUNT OF GRAINS HAVING RATIO b/a 2 (VOL. %) | WEIGHT CHANGE PERCENT (WT %) | PRESENCE OF MAGNETIC FIELD | PROPERTIES OF BONDED MAGNETS Br (KG) | iHc (KOe) | $BH_{max}$ (MGOe) |
|---|---|---|---|---|---|---|---|---|---|---|---|---|---|---|---|---|---|---|---|---|
| 2 | 12.2 | 0.4 | — | — | 6.0 | — | 7.0* | — | — | — | — | 7.0* | BAL. | 0.5 | 90 | 0.125 | PRESENT | 6.3 | 3.0 | 4.3 |
| | | | | | | | | | | | | | | | | | NIL | 4.7 | 3.1 | 3.2 |
| 3 | 12.2 | 0.4 | — | — | 6.1 | — | — | 7.0* | — | — | — | 7.0* | BAL. | 0.5 | 90 | 0.080 | PRESENT | 5.5 | 2.1 | 3.0 |
| | | | | | | | | | | | | | | | | | NIL | 5.0 | 2.4 | 2.3 |
| 4 | 12.1 | 0.4 | — | — | 5.9 | — | — | — | 6.9* | — | — | 6.9* | BAL. | 0.5 | 80 | 0.101 | PRESENT | 6.0 | 2.3 | 3.2 |
| | | | | | | | | | | | | | | | | | NIL | 4.9 | 2.5 | 2.0 |
| 5 | 12.2 | 0.4 | — | — | 6.0 | — | — | — | — | 7.0* | — | 7.0* | BAL. | 2.0 | 70 | 0.131 | PRESENT | 5.8 | 4.8 | 4.2 |
| | | | | | | | | | | | | | | | | | NIL | 5.0 | 5.0 | 3.5 |
| 6 | 12.1 | 0.4 | — | — | 6.0 | — | — | — | — | — | 7.0* | 7.0* | BAL. | 1.0 | 70 | 0.113 | PRESENT | 5.9 | 4.5 | 4.5 |
| | | | | | | | | | | | | | | | | | NIL | 5.1 | 4.7 | 3.6 |
| 7 | 12.0 | 0.3 | — | — | 6.0 | 3.5 | — | 3.5 | — | — | — | 7.0* | BAL. | 0.5 | 85 | 0.206 | PRESENT | 5.2 | 2.1 | 2.1 |
| | | | | | | | | | | | | | | | | | NIL | 4.9 | 2.2 | 1.7 |
| 8 | 12.2 | 0.4 | — | — | 6.0 | — | 3.5 | — | 3.5 | — | — | 7.0* | BAL. | 0.5 | 80 | 0.131 | PRESENT | 5.5 | 1.8 | 2.0 |
| | | | | | | | | | | | | | | | | | NIL | 4.8 | 2.1 | 1.6 |
| 9 | 12.2 | — | — | — | 6.1 | 0.1 | — | 0.1 | — | 0.1 | 0.1 | 0.4 | BAL. | 0.01* | 90 | 0.066 | PRESENT | 3.2 | 1.7 | 1.1 |
| | | | | | | | | | | | | | | | | | NIL | 3.0 | 2.0 | <1 |
| 10 | 13.0 | — | 2.0 | — | 8.0 | — | 0.2 | — | 0.2 | — | — | 0.4 | BAL. | 2.5* | 90 | 1.916 | PRESENT | 2.5 | 2.0 | <1 |
| | | | | | | | | | | | | | | | | | NIL | 1.8 | 2.2 | <1 |
| 11 | 25.0* | — | — | — | 7.0 | 1.0 | — | — | — | 0.2 | — | 1.2 | BAL. | 5.0 | 70 | 1.604 | PRESENT | 2.0 | 0.5 | <1 |
| | | | | | | | | | | | | | | | | | NIL | 1.4 | 0.6 | <1 |
| 12 | 8.0* | — | — | — | 7.0 | — | — | 0.5 | — | 1.0 | 0.5 | 2.0 | BAL. | 0.2 | 85 | 0.131 | PRESENT | 2.3 | 0.4 | <1 |
| | | | | | | | | | | | | | | | | | NIL | 1.5 | 0.4 | <1 |
| 13 | 16.0 | — | — | — | 2.0* | — | 0.1 | — | — | — | — | 0.1 | BAL. | 2.0 | 85 | 1.134 | PRESENT | 1.8 | 0.8 | <1 |
| | | | | | | | | | | | | | | | | | NIL | 1.5 | 0.8 | <1 |
| 14 | 14.0 | — | — | — | 25.0* | — | — | 0.1 | 0.1 | — | — | 0.2 | BAL. | 0.8 | 80 | 0.526 | PRESENT | 3.5 | 0.3 | <1 |
| | | | | | | | | | | | | | | | | | NIL | 2.0 | 0.4 | <1 |
| PRIOR ART EXAMPLE 1 | 14.1 | — | — | — | 7.2 | — | — | — | — | — | — | — | BAL. | 0.5 | 90 | 0.708 | PRESENT | 5.7 | 12.1 | 7.5 |
| | | | | | | | | | | | | | | | | | NIL | 5.6 | 12.3 | 7.0 |
| PRIOR ART EXAMPLE 2 | 14.1 | — | — | — | 7.2 | — | — | — | — | — | — | — | BAL. | 1.0 | 40* | 1.213 | PRESENT | 6.8 | 10.3 | 9.1 |
| | | | | | | | | | | | | | | | | | NIL | 5.1 | 10.6 | 5.8 |

ASTERISKED VALUES FALL OUTSIDE RANGE OF PRESENT INVENTION

It will be learned from the results of Table 1 that bonded magnets according to Examples 1–46 obtained by press molding in the transverse magnetic field R-Fe-B permanent magnet powders including one or more of Ti, V, Nb, Ta, Al, and Si, are superior to bonded magnets obtained by press moding the permanent magnet powders in the non-magnetic field in magnetic properties, particularly maximum energy product $(BH)_{max}$ and residual flux density Br, i.e. magnetic anisotropy. On the other hand, as shown by Comparative Examples 1–14, if the total content of one or more of Ti, V, Nb, Ta, Al, and Si falls outside the range of the present invention, the magnetic anisotropy degrades. Further, if the average recrystallized grain size, the R content, or the B content falls outside the range of the present invention (the values falling outside the range of the present invention are asterisked in Table 1), there will occur a degration in the magnetic properties. Moreover, as shown by Prior Art Example 1, if none of Ti, V, Nb, Ta, Al, and Si is contained, satisfactory magnetic anisotropy and satisfactory corrosion resistivity cannot be exhibited even if the bonded magnet is obtained under the same manufacturing conditions as bonded magnets according to the present invention. Furthermore, although the R-Fe-B permanent magnet powder according to Prior Art Example 2 which has been subjected to hot deformation processing to have flattened recrystallized grains to impart magnetic anisotropy thereto and has only about 40 volumetric % of recrystallized grains satisfying the relationship of $b/a<2$ are not so inferior in magnetic anisotropy to the R-Fe-B permanent magnet powders including one or more of Ti, V, Nb, Ta, Al, and Si according to Examples 1–46, the former shows a higher weight change percent as a result of the humidity test, which means that it has degraded corrosion resistivity.

II. Examples 47–96, Comparative Examples 15–28, and Prior Art Examples 3–4:

R-Fe-Co-B alloy ingots containing Co, and one or more of Ti, V, Nb, Ta, Al, and Si, and R-Fe-Co-B alloy ingots not containing any of Ti, V, Nb, Ta, Al, and Si, having chemical compositions shown in Table 2 were prepared by plasma melting followed by casting. These ingots were subjected to a homogenization treatment by soaking at a temperature of 1140° C. in an argon gas atmosphere for 20 hours, and the homogenized ingots were crushed into sizes of about 20 mm square as starting alloy materials. The starting alloy materials were heated from room temperature up to 840° C. in a hydrogen gas atmosphere under 1 atmospheric pressure and then heat treated by soaking at 840° C. for 4 hours in the hydrogen gas atmosphere. Then, the hydrogen atmosphere was dehydrogenated until its temperature became 830° C. and its vacuum became $1\times10^{-1}$Torr or less, immediately followed by charging an argon gas into the furnace to rapidly cool the starting material alloys. After the dehydrogenation, the starting material alloys were again heat treated at 640° C. in the argon gas atmosphere. The heat treated alloys were charged into a mortar and lightly crushed into magnet powders having an average particle size of 40 μm according to Examples 47–96, Comparative Examples 15–28 and Prior Art Example 3. Part of the starting material alloy of Prior Art Example 3 obtained just after the dehydrogenation was hot pressed at 680° C. under a vacuum of $1\times10^{-3}$Torr into a relative density of 98%, followed by being subjected to deformation processing at 750° C. until its height was reduced to one fourth as high as its original height. The resulting bulk was crushed into an average particle size of 40 μm to obtain a magnetic powder according to Prior Art Example 4. The R-Fe-Co-B permanent magnet powders according to Examples 47–96, Comparative Examples 15–28 and Prior Art Examples 3–4 thus prepared were subjected to measurements of the average recrystallized grain size and amount (volumetric %) of recrystallized grains which satisfy the aforementioned relationship of $b/a<2$. Then, these R-Fe-Co-B peranent magnet powders were sieved into particle sizes falling within a range of 50–420 μm, and the thus sieved powders were each picked up in part by an amount of 100 g, and the picked up powders were subjected to a humidity test where they were soaked in an atmosphere having a temperature of 80° C. and a humidity of 95%. After the soaking over 1,000 hours, a change in the weight of each powder due to oxidation was measured, the results of which are shown in terms of weight change percent (weight %) in Table 2.

The R-Fe-Co-B permanent magnet powders according to Examples 47–96, Comparative Examples 15–28 and Prior Art Examples 3–4 were mixed with 3.0 weight % of epoxy resin, and the resulting mixture was press molded under a pressure of 6 Ton/cm$^2$ in a transverse magnetic field of 25KOe or in a non-magnetic field, followed by being subjected to a thermosetting treatment where they were soaked at 120° C. for 2 hours, to obtain bonded magnets according to Examples 47–96, Comparative Examples 15–28, and Prior Art Examples 3–4.

TABLE 2

| SPECIMEN | | R—Fe—B PERMANENT MAGNETIC POWDER: CHEMICAL COMPOSITION (ATOMIC %) Nd | Tb | Dy | Pr | Co | B | TOTAL: Ti | V | Na | Ta | Al | Si | Total | Fe | AVERAGE GRAIN SIZE (μm) | AMOUNT OF GRAINS HAVING RATIO b/a 2 (VOL. %) | WEIGHT CHANGE PERCENT (WT %) | PRESENCE OF MAGNETIC FIELD | PROPERTIES OF BONDED MAGNETS: Br (KG) | iHc (KOe) | $BH_{max}$ (MGOe) |
|---|---|---|---|---|---|---|---|---|---|---|---|---|---|---|---|---|---|---|---|---|---|---|
| EXAMPLES ACCORDING TO PRESENT INVENTION | 47 | 12.1 | — | 0.5 | — | 11.5 | 6.1 | 0.01 | — | — | — | — | — | 0.01 | BAL. | 0.5 | 90 | 0.243 | PRESENT | 7.5 | 10.0 | 11.8 |
| | | | | | | | | | | | | | | | | | | | NIL | 6.0 | 10.2 | 7.8 |
| | 48 | 12.2 | — | 0.4 | — | 11.5 | 5.9 | 0.1 | — | — | — | — | — | 0.1 | BAL. | 0.2 | 100 | 0.236 | PRESENT | 8.0 | 9.5 | 14.0 |
| | | | | | | | | | | | | | | | | | | | NIL | 5.9 | 9.8 | 7.6 |
| | 49 | 12.0 | — | 0.4 | — | 11.6 | 5.9 | 0.6 | — | — | — | — | — | 0.6 | BAL. | 0.2 | 85 | 0.214 | PRESENT | 7.8 | 9.1 | 13.2 |
| | | | | | | | | | | | | | | | | | | | NIL | 5.9 | 9.3 | 7.4 |
| | 50 | 12.2 | — | 0.4 | — | 11.4 | 6.1 | 4.9 | — | — | — | — | — | 4.9 | BAL. | 0.3 | 90 | 0.185 | PRESENT | 7.5 | 6.2 | 10.6 |
| | | | | | | | | | | | | | | | | | | | NIL | 5.1 | 6.4 | 5.5 |
| | 51 | 12.0 | — | 0.4 | — | 11.5 | 6.1 | — | 0.05 | — | — | — | — | 0.05 | BAL. | 0.6 | 90 | 0.255 | PRESENT | 7.7 | 11.0 | 12.6 |
| | | | | | | | | | | | | | | | | | | | NIL | 6.0 | 11.2 | 5.1 |
| | 52 | 12.1 | — | 0.5 | — | 11.6 | 6.1 | — | 0.1 | — | — | — | — | 0.1 | BAL. | 0.2 | 90 | 0.230 | PRESENT | 8.2 | 10.2 | 14.2 |
| | | | | | | | | | | | | | | | | | | | NIL | 6.0 | 10.5 | 5.7 |
| | 53 | 12.1 | — | 0.4 | — | 11.5 | 6.1 | — | 1.0 | — | — | — | — | 1.0 | BAL. | 0.1 | 80 | 0.209 | PRESENT | 8.0 | 9.0 | 13.8 |
| | | | | | | | | | | | | | | | | | | | NIL | 5.7 | 9.4 | 7.0 |
| | 54 | 12.1 | — | 0.4 | — | 11.6 | 6.1 | — | 3.9 | — | — | — | — | 3.9 | BAL. | 0.2 | 90 | 0.156 | PRESENT | 7.7 | 8.6 | 11.3 |
| | | | | | | | | | | | | | | | | | | | NIL | 5.1 | 8.8 | 5.3 |
| | 55 | 12.1 | — | — | 0.5 | 11.6 | 6.0 | — | — | 0.03 | — | — | — | 0.03 | BAL. | 0.4 | 90 | 0.273 | PRESENT | 8.7 | 11.5 | 16.0 |
| | | | | | | | | | | | | | | | | | | | NIL | 6.0 | 11.7 | 8.0 |
| | 56 | 12.0 | — | — | 0.7 | 11.6 | 6.0 | — | — | 0.2 | — | — | — | 0.2 | BAL. | 0.2 | 95 | 0.260 | PRESENT | 9.1 | 10.7 | 18.2 |
| | | | | | | | | | | | | | | | | | | | NIL | 5.7 | 11.0 | 7.1 |
| | 57 | 12.0 | — | — | 0.6 | 11.5 | 6.0 | — | — | 1.0 | — | — | — | 1.0 | BAL. | 0.2 | 100 | 0.180 | PRESENT | 8.5 | 10.3 | 14.7 |
| | | | | | | | | | | | | | | | | | | | NIL | 5.6 | 10.6 | 6.8 |
| | 58 | 11.9 | — | — | 0.6 | 11.4 | 6.1 | — | — | 4.5 | — | — | — | 4.5 | BAL. | 0.5 | 90 | 0.147 | PRESENT | 7.5 | 7.4 | 11.7 |
| | | | | | | | | | | | | | | | | | | | NIL | 5.0 | 7.6 | 5.1 |
| | 59 | 12.3 | 0.2 | — | — | 11.6 | 6.0 | — | — | — | 0.02 | — | — | 0.02 | BAL. | 0.5 | 80 | 0.270 | PRESENT | 8.6 | 11.2 | 15.2 |
| | | | | | | | | | | | | | | | | | | | NIL | 5.9 | 11.4 | 7.6 |
| | 60 | 12.3 | 0.2 | — | — | 11.5 | 5.9 | — | — | — | 0.2 | — | — | 0.2 | BAL. | 0.1 | 95 | 0.221 | PRESENT | 9.0 | 10.2 | 17.3 |
| | | | | | | | | | | | | | | | | | | | NIL | 5.7 | 10.6 | 7.3 |
| | 61 | 12.2 | 0.3 | — | — | 11.6 | 6.1 | — | — | — | 2.3 | — | — | 2.3 | BAL. | 0.05 | 80 | 0.188 | PRESENT | 8.3 | 8.0 | 13.5 |
| | | | | | | | | | | | | | | | | | | | NIL | 5.5 | 8.2 | 6.7 |
| | 62 | 12.3 | 0.3 | — | — | 11.6 | 5.8 | — | — | — | 3.8 | — | — | 3.8 | BAL. | 0.2 | 85 | 0.163 | PRESENT | 7.5 | 6.7 | 11.5 |
| | | | | | | | | | | | | | | | | | | | NIL | 5.1 | 6.9 | 5.8 |
| | 63 | 12.6 | — | — | — | 11.5 | 6.0 | — | — | — | — | 0.01 | — | 0.01 | BAL. | 0.4 | 80 | 0.301 | PRESENT | 6.7 | 12.1 | 10.2 |
| | | | | | | | | | | | | | | | | | | | NIL | 5.9 | 12.3 | 7.7 |
| | 64 | 12.5 | — | — | — | 11.6 | 6.1 | — | — | — | — | 0.5 | — | 0.5 | BAL. | 0.4 | 80 | 0.296 | PRESENT | 7.7 | 13.4 | 13.0 |
| | | | | | | | | | | | | | | | | | | | NIL | 5.8 | 13.6 | 7.4 |
| | 65 | 12.4 | — | — | — | 11.6 | 6.0 | — | — | — | — | 2.5 | — | 2.5 | BAL. | 0.5 | 70 | 0.245 | PRESENT | 7.1 | 15.5 | 11.5 |
| | | | | | | | | | | | | | | | | | | | NIL | 5.6 | 15.8 | 7.0 |
| | 66 | 12.4 | — | — | — | 11.6 | 6.1 | — | — | — | — | 4.9 | — | 4.9 | BAL. | 1.0 | 70 | 0.130 | PRESENT | 7.4 | 12.4 | 11.4 |
| | | | | | | | | | | | | | | | | | | | NIL | 5.2 | 12.6 | 4.9 |
| | 67 | 11.0 | — | — | 1.5 | 11.6 | 6.0 | — | — | — | — | — | 0.04 | 0.04 | BAL. | 0.3 | 95 | 0.252 | PRESENT | 7.5 | 11.7 | 12.2 |
| | | | | | | | | | | | | | | | | | | | NIL | 6.0 | 12.0 | 8.0 |
| | 68 | 11.0 | — | — | 1.6 | 11.7 | 6.0 | — | — | — | — | — | 0.5 | 0.5 | BAL. | 0.2 | 90 | 0.216 | PRESENT | 8.7 | 14.1 | 15.7 |
| | | | | | | | | | | | | | | | | | | | NIL | 6.1 | 14.2 | 8.1 |
| | 69 | 11.0 | — | — | 1.5 | 11.5 | 5.9 | — | — | — | — | — | 1.5 | 1.5 | BAL. | 0.2 | 80 | 0.200 | PRESENT | 8.8 | 13.5 | 16.5 |
| | | | | | | | | | | | | | | | | | | | NIL | 5.8 | 13.8 | 7.3 |
| | 70 | 11.0 | — | — | 1.6 | 11.7 | 5.9 | — | — | — | — | — | 3.6 | 3.6 | BAL. | 0.1 | 95 | 0.162 | PRESENT | 8.6 | 12.4 | 15.0 |

TABLE 2-continued

| SPECIMEN | R—Fe—B PERMANENT MAGNETIC POWDER: CHEMICAL COMPOSITION (ATOMIC %) Nd | Tb | Dy | Pr | Co | B | Ti | V | Na | Ta | Al | Si | TOTAL | Fe | AVERAGE GRAIN SIZE (μm) | AMOUNT OF GRAINS HAVING RATIO b/a 2 (VOL. %) | WEIGHT CHANGE PERCENT (WT %) | PRESENCE OF MAGNETIC FIELD | PROPERTIES OF BONDED MAGNETS Br (KG) | iHc (KOe) | $BH_{max}$ (MGOe) |
|---|---|---|---|---|---|---|---|---|---|---|---|---|---|---|---|---|---|---|---|---|---|
| | | | | | | | | | | | | | | | | | | NIL | 5.3 | 12.6 | 5.5 |
| 71 | 12.5 | — | — | 0.1 | 11.5 | 6.0 | 0.2 | 0.3 | — | — | — | 1.0 | 1.5 | BAL. | 0.5 | 90 | 0.235 | PRESENT | 7.5 | 11.7 | 12.2 |
| | | | | | | | | | | | | | | | | | | NIL | 5.2 | 12.0 | 6.1 |
| 72 | 12.2 | — | 0.4 | — | 8.7 | 6.0 | — | 0.1 | 0.2 | — | — | — | 0.3 | BAL. | 0.2 | 90 | 0.389 | PRESENT | 9.1 | 10.3 | 18.1 |
| | | | | | | | | | | | | | | | | | | NIL | 5.6 | 10.6 | 7.0 |
| 73 | 12.3 | — | 0.2 | — | 15.5 | 6.0 | — | — | 0.1 | 0.1 | — | 1.0 | 1.2 | BAL. | 0.3 | 95 | 0.145 | PRESENT | 9.2 | 11.0 | 18.5 |
| | | | | | | | | | | | | | | | | | | NIL | 5.7 | 11.3 | 7.1 |
| 74 | 12.7 | — | — | — | 11.2 | 5.9 | — | — | — | 0.1 | 0.9 | — | 1.0 | BAL. | 0.4 | 100 | 0.261 | PRESENT | 9.1 | 11.8 | 17.7 |
| | | | | | | | | | | | | | | | | | | NIL | 5.5 | 12.1 | 6.5 |
| 75 | 12.1 | — | — | 0.5 | 6.4 | 6.0 | — | — | 0.2 | — | 0 | 1.0 | 1.2 | BAL. | 0.3 | 90 | 0.357 | PRESENT | 9.3 | 12.1 | 19.1 |
| | | | | | | | | | | | | | | | | | | NIL | 5.5 | 12.4 | 6.7 |
| 76 | 12.2 | — | — | — | 11.0 | 6.1 | 0 | 0.1 | 0.5 | — | 1.0 | — | 1.6 | BAL. | 0.4 | 80 | 0.266 | PRESENT | 8.7 | 10.8 | 16.2 |
| | | | | | | | | | | | | | | | | | | NIL | 5.3 | 11.0 | 6.0 |
| 77 | 12.2 | — | 0.3 | — | 11.5 | 6.1 | — | 0 | — | 0.2 | — | 1.4 | 1.6 | BAL. | 0.2 | 80 | 0.274 | PRESENT | 9.1 | 11.5 | 17.4 |
| | | | | | | | | | | | | | | | | | | NIL | 5.6 | 12.1 | 7.0 |
| 78 | 12.0 | — | 0.3 | — | 11.5 | 6.1 | — | 0 | 0.2 | 0.1 | 1.2 | 0.5 | 2.0 | BAL. | 1.0 | 85 | 0.267 | PRESENT | 8.8 | 13.4 | 16.2 |
| | | | | | | | | | | | | | | | | | | NIL | 5.4 | 13.8 | 6.2 |
| 79 | 12.4 | — | — | 0.2 | 11.5 | 6.0 | 0.1 | — | 0.1 | — | 1.3 | 0.8 | 2.3 | BAL. | 0.1 | 90 | 0.245 | PRESENT | 8.7 | 13.0 | 16.1 |
| | | | | | | | | | | | | | | | | | | NIL | 5.3 | 13.3 | 6.0 |
| 80 | 12.7 | — | — | — | 11.3 | 6.0 | 0.1 | 0.1 | 0.1 | 0.1 | 0.1 | 0.1 | 0.6 | BAL. | 0.2 | 90 | 0.265 | PRESENT | 8.8 | 10.4 | 17.0 |
| | | | | | | | | | | | | | | | | | | NIL | 5.6 | 10.6 | 6.8 |
| 81 | 12.1 | — | — | — | 11.3 | 6.0 | 0.2 | — | 0.5 | — | — | 1.5 | 2.2 | BAL. | 0.5 | 80 | 0.244 | PRESENT | 8.6 | 12.5 | 15.4 |
| | | | | | | | | | | | | | | | | | | NIL | 5.3 | 12.9 | 6.1 |
| 82 | 12.0 | — | — | — | 11.3 | 6.0 | 0.1 | 0.1 | 0.6 | 0.5 | 1.2 | 1.5 | 4.0 | BAL. | 0.4 | 80 | 0.180 | PRESENT | 8.2 | 13.7 | 14.6 |
| | | | | | | | | | | | | | | | | | | NIL | 5.0 | 14.0 | 5.4 |
| 83 | 13.0 | — | 0.7 | — | 11.5 | 6.0 | — | — | 0.1 | — | — | 1.0 | 1.1 | BAL. | 0.5 | 60 | 0.246 | PRESENT | 7.7 | 14.0 | 12.3 |
| | | | | | | | | | | | | | | | | | | NIL | 5.5 | 14.1 | 6.4 |
| 84 | 13.0 | — | 0.7 | — | 11.5 | 6.0 | — | — | 0.1 | — | 0.5 | 1.0 | 1.6 | BAL. | 1.0 | 50 | 0.303 | PRESENT | 7.7 | 14.4 | 11.7 |
| | | | | | | | | | | | | | | | | | | NIL | 5.6 | 14.6 | 6.8 |
| 85 | 10.0 | — | — | — | 5.8 | 7.0 | — | 0.1 | 0.1 | 0.1 | — | 1.2 | 1.5 | BAL. | 0.2 | 95 | 0.173 | PRESENT | 9.4 | 8.7 | 11.5 |
| | | | | | | | | | | | | | | | | | | NIL | 5.5 | 9.1 | 3.6 |
| 86 | 14.0 | — | — | — | 11.6 | 7.2 | — | 0.1 | 0.1 | 0.1 | — | 1.2 | 1.5 | BAL. | 0.5 | 90 | 0.348 | PRESENT | 7.3 | 14.4 | 11.2 |
| | | | | | | | | | | | | | | | | | | NIL | 5.7 | 14.6 | 7.0 |
| 87 | 20.0 | — | — | — | 15.7 | 7.2 | — | 0.1 | 0.1 | 0.1 | — | 1.2 | 1.5 | BAL. | 2.0 | 70 | 0.525 | PRESENT | 7.3 | 9.7 | 10.2 |
| | | | | | | | | | | | | | | | | | | NIL | 4.6 | 9.8 | 3.5 |
| 88 | 15.5 | — | — | 0.5 | 11.5 | 3.0 | — | — | 0.1 | — | 0.5 | 1.0 | 1.6 | BAL. | 0.2 | 85 | 0.224 | PRESENT | 7.8 | 8.7 | 10.5 |
| | | | | | | | | | | | | | | | | | | NIL | 4.6 | 8.9 | 3.5 |
| 89 | 13.5 | — | — | 0.5 | 11.5 | 10.0 | — | — | 0.1 | — | 0.5 | 1.0 | 1.6 | BAL. | 1.0 | 85 | 0.185 | PRESENT | 7.5 | 12.1 | 11.5 |
| | | | | | | | | | | | | | | | | | | NIL | 5.3 | 12.4 | 5.4 |
| 90 | 14.0 | — | — | 0.5 | 11.5 | 20.0 | — | — | 0.1 | — | 0.5 | 1.0 | 1.6 | BAL. | 2.0 | 90 | 0.106 | PRESENT | 8.7 | 8.5 | 11.6 |
| | | | | | | | | | | | | | | | | | | NIL | 4.9 | 8.7 | 3.7 |
| 91 | 13.1 | — | 0.8 | — | 16.3 | 7.5 | 0.1 | — | — | — | 1.0 | 1.0 | 2.1 | BAL. | 5.0 | 80 | 0.557 | PRESENT | 7.9 | 11.0 | 10.5 |
| | | | | | | | | | | | | | | | | | | NIL | 4.6 | 11.2 | 3.5 |
| 92 | 13.2 | — | 0.8 | — | 16.4 | 7.5 | 0.1 | — | — | — | 1.0 | 1.0 | 2.1 | BAL. | 10.0 | 80 | 0.609 | PRESENT | 8.5 | 6.3 | 10.6 |
| | | | | | | | | | | | | | | | | | | NIL | 5.6 | 6.5 | 4.5 |
| 93 | 13.1 | — | 0.8 | — | 16.3 | 7.5 | 0.1 | — | — | — | 1.0 | 1.0 | 2.1 | BAL. | 20.0 | 90 | 0.685 | PRESENT | 8.4 | 5.5 | 10.1 |
| | | | | | | | | | | | | | | | | | | NIL | 5.1 | 5.7 | 3.3 |

TABLE 2-continued

| SPECIMEN | | R—Fe—B PERMANENT MAGNETIC POWDER: CHEMICAL COMPOSITION (ATOMIC %) Nd | Tb | Dy | Pr | Co | B | Ti | V | Na | Ta | Al | Si | TOTAL | Fe | AVERAGE GRAIN SIZE (μm) | AMOUNT OF GRAINS HAVING RATIO b/a 2 (VOL. %) | WEIGHT CHANGE PERCENT (WT %) | PRESENCE OF MAGNETIC FIELD | PROPERTIES OF BONDED MAGNETS Br (KG) | iHc (KOe) | $BH_{max}$ (MGOe) |
|---|---|---|---|---|---|---|---|---|---|---|---|---|---|---|---|---|---|---|---|---|---|---|
| | 94 | 12.0 | 0.5 | — | — | 5.3 | 7.0 | — | — | 0.2 | — | — | 1.5 | 1.7 | BAL. | 0.4 | 85 | 0.244 | PRESENT | 8.7 | 14.0 | 15.6 |
| | | | | | | | | | | | | | | | | | | | NIL | 6.1 | 14.2 | 8.0 |
| | 95 | 12.0 | 0.5 | — | — | 30.2 | 7.0 | — | — | 0.3 | — | — | 1.5 | 1.7 | BAL. | 0.4 | 70 | 0.092 | PRESENT | 7.4 | 10.2 | 10.3 |
| | | | | | | | | | | | | | | | | | | | NIL | 5.5 | 10.5 | 5.2 |
| | 96 | 12.0 | 0.5 | — | — | 45.2 | 7.0 | — | — | 0.3 | — | — | 1.5 | 1.7 | BAL. | 0.5 | 80 | 0.053 | PRESENT | 7.9 | 7.7 | 11.0 |
| | | | | | | | | | | | | | | | | | | | NIL | 4.8 | 7.9 | 3.7 |
| COMPARATIVE EXAMPLES | 15 | 12.1 | — | 0.5 | — | 7.0 | 6.0 | 0.5 | — | 0.5 | — | — | — | 1.0 | BAL. | 0.01* | 90 | 0.750 | PRESENT | 3.5 | 2.1 | 1.0 |
| | | | | | | | | | | | | | | | | | | | NIL | 3.1 | 2.3 | <1 |
| | 16 | 13.0 | — | 2.0 | — | 7.0 | 8.0 | 0.5 | 0.5 | — | — | — | 2.0 | 3.0 | BAL. | 25* | 80 | 1.815 | PRESENT | 3.0 | 2.5 | <1 |
| | | | | | | | | | | | | | | | | | | | NIL | 2.0 | 2.5 | <1 |
| | 17 | 12.3 | — | 0.4 | — | 7.0 | 6.1 | 7.9* | — | — | — | — | — | 7.9* | BAL. | 0.5 | 90 | 0.140 | PRESENT | 5.6 | 1.8 | 2.1 |
| | | | | | | | | | | | | | | | | | | | NIL | 4.2 | 2.0 | 1.3 |
| | 18 | 12.2 | — | 0.4 | — | 7.2 | 5.9 | — | 7.0* | — | — | — | — | 7.0* | BAL. | 0.2 | 95 | 0.125 | PRESENT | 6.0 | 3.0 | 2.5 |
| | | | | | | | | | | | | | | | | | | | NIL | 4.0 | 3.1 | 1.4 |
| | 19 | 12.0 | — | 0.4 | — | 7.0 | 6.0 | — | — | 6.7* | — | — | — | 6.7* | BAL. | 0.2 | 90 | 0.108 | PRESENT | 5.7 | 2.4 | 2.2 |
| | | | | | | | | | | | | | | | | | | | NIL | 3.5 | 2.5 | 1.3 |
| | 20 | 12.1 | — | 0.5 | — | 7.0 | 6.0 | — | — | — | 7.1* | — | — | 7.1* | BAL. | 0.5 | 90 | 0.094 | PRESENT | 5.6 | 1.0 | 1.2 |
| | | | | | | | | | | | | | | | | | | | NIL | 3.6 | 1.2 | <1 |
| | 21 | 12.0 | — | 0.5 | — | 7.0 | 6.1 | — | — | — | — | 6.5* | — | 6.5* | BAL. | 0.5 | 85 | 0.122 | PRESENT | 3.2 | 5.2 | 1.4 |
| | | | | | | | | | | | | | | | | | | | NIL | 3.0 | 5.3 | 1.3 |
| | 22 | 12.1 | — | 0.5 | — | 7.2 | 6.0 | — | — | — | — | — | 6.9* | 6.9* | BAL. | 1.0 | 85 | 0.092 | PRESENT | 3.7 | 5.0 | 1.4 |
| | | | | | | | | | | | | | | | | | | | NIL | 2.8 | 5.2 | 1.1 |
| | 23 | 12.5 | — | — | — | 7.0 | 6.1 | 2.5 | — | 2.5 | 2.5 | — | — | 7.5* | BAL. | 0.2 | 80 | 0.088 | PRESENT | 4.2 | 1.8 | 1.4 |
| | | | | | | | | | | | | | | | | | | | NIL | 3.3 | 1.9 | 1.1 |
| | 24 | 9.0* | — | — | — | 11.5 | 7.0 | — | 0.5 | — | 0.5 | — | 0.5 | 1.5 | BAL. | 0.2 | 90 | 0.097 | PRESENT | 1.7 | 0.2 | <1 |
| | | | | | | | | | | | | | | | | | | | NIL | 1.1 | 0.2 | <1 |
| | 25 | 25.0* | — | — | — | 11.4 | 7.1 | — | — | — | — | 1.0 | 1.0 | 2.0 | BAL. | 3.0 | 80 | 1.556 | PRESENT | 1.7 | 0.3 | <1 |
| | | | | | | | | | | | | | | | | | | | NIL | 1.6 | 0.4 | <1 |
| | 26 | 13.0 | — | — | — | 55.0* | 7.0 | 2.5 | — | — | — | — | 1.0 | 3.5 | BAL. | 1.0 | 70 | 0.044 | PRESENT | 1.4 | 0.3 | <1 |
| | | | | | | | | | | | | | | | | | | | NIL | 1.1 | 0.4 | <1 |
| | 27 | 16.0 | — | — | 0.5 | 11.3 | 2.0* | — | 0.2 | — | — | 1.0 | — | 1.2 | BAL. | 1.0 | 70 | 1.218 | PRESENT | 1.4 | 0.4 | <1 |
| | | | | | | | | | | | | | | | | | | | NIL | 1.3 | 0.6 | <1 |
| | 28 | 14.0 | — | — | 0.5 | 11.4 | 21.0* | — | 0.2 | — | — | 1.0 | — | 1.2 | BAL. | 0.5 | 80 | 0.101 | PRESENT | 2.3 | 1.2 | <1 |
| | | | | | | | | | | | | | | | | | | | NIL | 2.1 | 1.2 | <1 |
| PRIOR ART EXAMPLE 3 | | 14.0 | — | — | — | 11.6 | 7.2 | — | — | — | — | — | — | — | BAL. | 0.3 | 90 | 0.665 | PRESENT | 6.3 | 13.4 | 8.8 |
| | | | | | | | | | | | | | | | | | | | NIL | 6.4 | 13.7 | 8.1 |
| PRIOR ART EXAMPLE 4 | | 14.0 | — | — | — | 11.6 | 7.2 | — | — | — | — | — | — | — | BAL. | 1.0 | 40* | 1.013 | PRESENT | 7.0 | 10.2 | 9.5 |
| | | | | | | | | | | | | | | | | | | | NIL | 5.0 | 10.4 | 5.3 |

ASTERISKED VALUES FALL OUTSIDE RANGE OF PRESENT INVENTION

The bonded magnets obtained by press molding in the transverse magnetic field and those obtained by press molding in the non-magnetic field were measured in respect of magnetic properties, the results of which are shown in Table 2. The measured magnetic properties of the two groups of bonded magnets were compared with each other to evaluate the magnetic anisotropy.

It will be learned from the results of Table 2 that:

(1) Bonded magnets according to Examples 47–96 obtained by press molding in the transverse magnetic field R-Fe-Co-B permanent magnet powders including one or more of Ti, V, Nb, Ta, Al, and Si, are superior to bonded magnets obtained by press moding the permanent magnet powders in the non-magnetic field in magnetic properties, particularly maximum energy product $(BH)_{max}$ and residual flux density Br. That is, the R-Fe-Co-B permanent magnet powders according to Examples 47–96 of the present invention have excellent magnetic anisotropy. On the other hand, bonded magnets manufactured from the R-Fe-Co-B permanent magnets according to Comparative Examples 15–28 of which the contents of some component elements and average recrystallized grain size show values falling outside the range of the present invention as asterisked in Table 2 have low magnetic anisotropy and very low magnetic properties.

(2) The R-Fe-Co-B permanent magnet powder according to Prior Art Example 3, in which none of Ti, V, Nb, Ta, Al, and Si is contained, exhibits inferior magnetic anisotropy and corrosion resistivity to the permanent magnet powders according to Examples 47–96 of the present invention, even if it is obtained under the same manufacturing conditions as the latter. Furthermore, it is to be noted that although the R-Fe-Co-B permanent magnet powder according to Prior Art Example 4 which has been subjected to hot deformation processing to have flattened recrystallized grains in order to impart anisotropy thereto and has only about 40 volumetric % of recrystallized grains satisfying the relationship of $b/a<2$ (in other words, the amount of recrystallized grains which are flattened in shape by the hot deformation processing such that the relationship of $b/a>2$ holds) are not so inferior in magnetic anisotropy to the R-Fe-Co-B permanent magnet powders according to Examples 47–96 of the present invention, the former shows a higher weight change percent obtained by the humidity test and hence greatly degraded corrosion resistivity.

As described above, according to the invention, by adding one or more of Ti, V, Nb, Ta, Al, and Si, together with Co if required, to the prior art R-Fe-B or R-Fe-Co-B permanent magnet powder, it is possible to obtain a R-Fe-B or R-Fe-Co-B permanent magnet powder having remarkably excellent magnetic anisotropy and excellent corrosion resistivity, only by using a $H_2$ treatment, without requiring hot deformation processing, to thereby enable to dispense with means for imparting magnetic anisotropy such as hot deformation processing as employed in conventional permanent magnet powders production.

What is claimed is:

1. A rare earth element-Fe-B permanent magnet power excellent in magnetic anisotropy and corrosion resistivity, consisting essentially of powder particles, wherein said powder particles each consist essentially of, in atomic percentage:

at least one element selected from the group consisting of yttrium and rare earth elements: 10–20%;

B: 3–20%;

at least one element selected from the group consisting of Ti, V, Nb, Ta, Al and Si: 0.001–5.0%; and Fe and inevitable impurities: the balance, said powder particles each having an aggregated recrystallized structure having a main phase thereof formed of a $R_2Fe_{14}B$ intermetallic compound phase having a tetragonal structure, wherein R is a rare earth element, said intermetallic compound phase being formed of recrystallized grains aggregated therein and including at least 50 volumetric % of recrystallized grains having a ratio of b/a smaller than 2, provided that a is the smallest diameter of each of said recrystallized grains, and b is the largest diameter thereof, said recrystallized grains forming said aggregated recrystallized structure having an average grain size of 0.05–20 μm.

2. The rare earth element-Fe-B permanent magnet powder as claimed in claim 1, wherein said average size of said recrystallized grains is 0.05–3 μm.

3. The rare earth element-Fe-B permanent magnet powder as claimed in claim 1 or 2, wherein said aggregated recrystallized structure in which said recrystallized grains are aggregated is formed substantially solely of a $R_2Fe_{14}B$ intermetallic compound phase.

4. The rare earth element-Fe-B permanent magnet powder as claimed in claim 1, wherein part of said B is replaced by at least one element selected from the group consisting of C, N, O and F.

5. A rare earth element-Fe-B permanent magnet powder as claimed in claim 1, further including at least one element selected from the group consisting of Ni, Cu, Zn, Ga, Ge, Zr, Mo, Hf and W.

6. A rare earth element-Fe-B bonded magnet manufactured from said rare earth element-Fe-B permanent magnet powder as claimed in any one of claims 1, 2, 4 or 5.

7. A rare earth element-Fe-B bonded magnet manufactured from said rare earth element-Fe-B permanent magnet powder as claimed in claim 3.

8. A rare earth element-Fe-Co-B permanent magnet powder excellent in magnetic anisotropy and corrosion resistivity, consisting essentially of powder particles, wherein said powder particles each consist essentially of, in atomic percentage:

at least one element selected from the group consisting of yttrium and rare earth elements: 10–20%;

Co: 0.1–50%;

B: 3–20%;

at least one element selected from the group consisting of Ti, V, Nb, Ta, Al and Si: 0.001–5.0%; and Fe and inevitable impurities: the balance, said powder particles each having an aggregated recrystallized structure having a main phase thereof formed of a $R_2(Fe,Co)_{14}B$ intermetallic compound phase having a tetragonal structure, wherein R is a rare earth element, said intermetallic compound phase being formed of recrystallized grains aggregated therein and including at least 50 volumetric % of recrystallized grains having a ratio of b/a smaller than 2, provided that a is the smallest diameter of each of said recrystallized grains, and b is the largest diameter thereof, said recrystallized grains forming said aggregated recrystallized structure having an average grain size of 0.05–20 μm.

9. The rare earth element-Fe-Co-B permanent magnet powder as claimed in claim 8, wherein said average size of said recrystallized grains is 0.05–3 μm.

10. The rare earth element-Fe-Co-B permanent magnet powder as claimed in claim 8 or 9, wherein said aggregated recrystallized structure in which said recrystallized grains are aggregated is formed substantially solely of a $R_2(Fe,Co)_{14}N$ intermetallic compound phase.

11. The rare earth element-Fe-Co-B permanent magnet powder as claimed in claim 8, wherein part of said B is replaced by at least one element selected from the group consisting of C, N, O and F.

12. The rare earth element-Fe-Co-B permanent magnet powder as claimed in claim 8, wherein Co: 0.1–20%.

13. The rare earth element-Fe-Co-B permanent magnet powder as claimed in claim 8, wherein the powder particles further consist essentially of at least one element selected from the group consisting of Ni, Cu, Zn, Ga, Ge, Zr, Mo, Hf and W.

14. A rare earth element-Fe-Co-B bonded magnet manufactured from said rare earth element-Fe-B permanent magnet powder as claimed in any one of claims 8, 9, 11, 12 or 13.

15. A rare earth element-Fe-B bonded magnet manufactured from said rare earth element-Fe-B permanent magnet powder as claimed in claim 10.

16. The rare earth element-Fe-B permanent magnet powder as claimed in claim 2, wherein the at least one rare earth element is in an amount of 11 to 15 atomic percentage; boron is in an amount of 4 to 8 atomic percentage; the at least one element selected from the group consisting of Ti, V, Nb, Ta, Al and Si is in an amount of 0.01 to 3.0 atomic percentage.

17. The rare earth element-Fe-B permanent magnet powder as claimed in claim 9, wherein the at least one rare earth element is in an amount of 11 to 15 atomic percentage; boron is in an amount of 4 to 8 atomic percentage; cobalt is in an amount of 0.1 to 20 atomic percentage; and the at least one element selected from the group consisting of Ti, V, Nb, Ta, Al and Si is in an amount of 0.01 to 3.0 atomic percentage.

* * * * *